United States Patent
Huang

(10) Patent No.: US 8,216,494 B2
(45) Date of Patent: Jul. 10, 2012

(54) METHOD FOR MAKING MOLD

(75) Inventor: Yung-Lun Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 335 days.

(21) Appl. No.: 12/612,039

(22) Filed: Nov. 4, 2009

(65) Prior Publication Data

US 2010/0289176 A1    Nov. 18, 2010

(30) Foreign Application Priority Data

May 14, 2009   (CN) ............... 2009 1 0302320

(51) Int. Cl.
*B28B 1/20*   (2006.01)

(52) U.S. Cl. .......... 264/2.5; 264/2.1; 264/219; 264/220; 264/224; 264/225; 264/226; 264/227; 264/310; 264/311

(58) Field of Classification Search .......... 264/2.1, 264/2.5, 219, 220, 221, 222, 223, 224, 225, 264/226, 227, 310, 311; 430/315
See application file for complete search history.

(56) References Cited

U.S. PATENT DOCUMENTS

| | | | | | |
|---|---|---|---|---|---|
| 2,480,229 | A | * | 8/1949 | Dow | 277/550 |
| 4,068,019 | A | * | 1/1978 | Boeckl | 264/311 |
| 5,294,257 | A | * | 3/1994 | Kelly et al. | 118/52 |
| 5,630,902 | A | * | 5/1997 | Galarneau et al. | 425/174.4 |
| 6,841,049 | B2 | * | 1/2005 | Ito et al. | 204/298.15 |
| 2005/0156346 | A1 | * | 7/2005 | Yu et al. | 264/219 |
| 2008/0011934 | A1 | * | 1/2008 | Verschuuren et al. | 264/225 |

\* cited by examiner

*Primary Examiner* — Joseph Del Sole
*Assistant Examiner* — Timothy Kennedy
(74) *Attorney, Agent, or Firm* — Altis Law Group, Inc.

(57) ABSTRACT

A method for making a mold, the method includes steps of: providing a substrate and a retaining member, the retaining member being made of polytetrafluoroethylene, and being ring-shaped; engaging the substrate with the retaining member; disposing viscous liquid polydimethyl siloxane containing material on the substrate within the retaining member; rotating the retaining member and the substrate to cause the polydimethyl siloxane containing material to spread out on the substrate and form a polydimethyl siloxane containing layer; press-molding the polydimethyl siloxane containing layer using a stamper to form one or more molding portions on the polydimethyl siloxane containing layer; solidifying the polydimethyl siloxane containing layer with the one or more molding portions; separating the stamper from the polydimethyl siloxane containing layer; and separating the substrate from the retaining member to obtain a mold.

8 Claims, 5 Drawing Sheets

100

```
providing a substrate and a hollow retaining
member, the retaining member being made of
polytetrafluoroethylene
          ↓
engaging the substrate with the retaining
member
          ↓
disposing polydimethyl siloxane containing
material on the substrate within the retaining
member
          ↓
rotating the retaining member and the substrate
to cause the polydimethyl siloxane containing
material to spread out on the substrate and
form a polydimethyl siloxane containing layer
          ↓
press-molding the polydimethyl siloxane
contained layer using a stamper to form one
or more molding portions on the polydimethyl
siloxane containing layer
          ↓
solidifying the polydimethyl siloxane containing
layer with the one or more molding portions
          ↓
separating the stamper from the polydimethyl
siloxane containing layer
          ↓
separating the substrate from the retaining
member to obtain a mold comprising the
substrate and the polydimethyl siloxane
containing layer with one or more molding
portions
```

FIG. 1

METHOD FOR MAKING MOLD

CROSS-REFERENCE TO RELATED APPLICATION

This application is related to, and claims the benefit of, a foreign priority application filed in China as Application No. 200910302320.1 on May 14, 2009. The related application is incorporated herein by reference.

BACKGROUND

1. Technical Field

The present disclosure relates to molds, and particularly, to a method for making a mold having polydimethyl siloxane (PDMS) containing molding portions.

2. Description of Related Art

Polydimethyl siloxane (PDMS) has been used as a material of molding portions of molds. The PDMS has elasticity, thus molding portions made of the PDMS are easy to be separated from molded workpieces. With this capability, the molding portions substantially made of the PDMS are widely used in press-molding arrays of microstructures, such as microlenses.

A typical method for making molds having PDMS containing molding portions, includes steps of mixing liquid PDMS with a hardener, eliminating air bubbles in the mixed material using a vacuum pump, and forming the PDMS containing molding portions of the molds using the mixed material.

However, in this way, the vacuum pump has to be used to eliminate the air bubbles, otherwise the PDMS containing molding portions may have inanitions therein.

What is needed, therefore, is a method for making a mold, which can overcome the above shortcomings.

BRIEF DESCRIPTION OF DRAWINGS

Many aspects of the present method for making a mold can be better understood with reference to the following drawings. The components in the drawings are not necessarily drawn to scale, the emphasis instead being placed upon clearly illustrating the principles of the present method for making a mold. Moreover, in the drawings, like reference numerals designate corresponding parts throughout the several views.

FIG. 1 is a flow chart of a method for making a mold in accordance with an embodiment.

DETAILED DESCRIPTION OF EMBODIMENTS

Embodiments of the present method for making a mold will now be described in detail below and with reference to the drawings.

Figure 2:
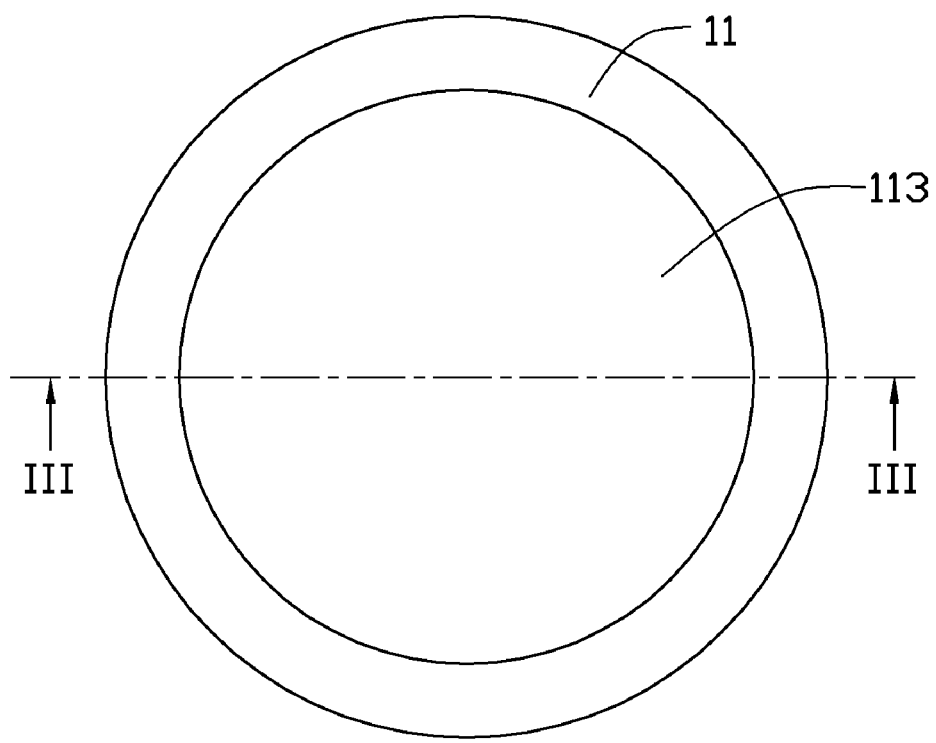
FIG. 2 is a schematic view showing a retaining member used in the method in FIG. 1.
Figure 3:
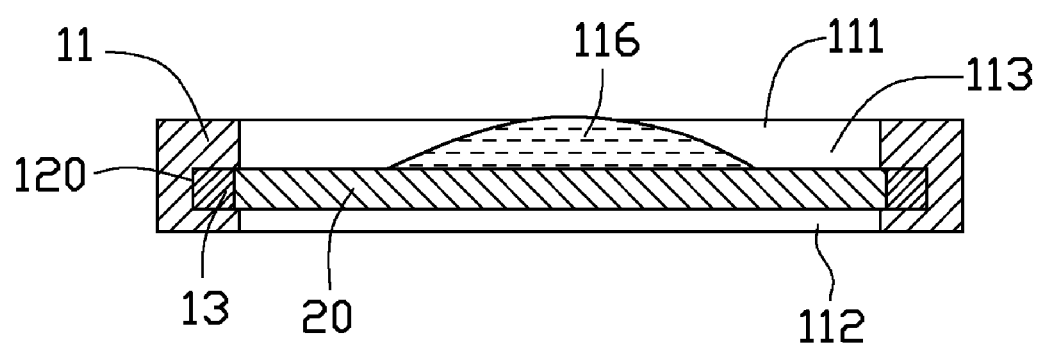
FIG. 3 is a sectional view showing the retaining member of FIG. 2 taken along line III-III, and a substrate retained in the retaining member, the substrate having a viscous liquid polydimethyl siloxane (PDMA) containing material disposed thereon.

Referring to FIGS. 1 to 3, a method 100 for making a mold in accordance with an embodiment, includes the following steps.

First, a hollow retaining member 11 and a substrate 20 are provided. The retaining member 11 is made of Teflon, e.g. polytetrafluoroethylene, which has the property of being non-viscous. The retaining member 11 includes an inner space 113, and a first opening 111 and an opposite second opening 112 both communicating with the inner space 113. In the present embodiment, the retaining member 11 is ring-shaped. A ring-shaped recess 120 is formed in an inner wall of the retaining member 11 adjacent to the second opening 112. A rubber ring 13 is received in the recess 120. The rubber ring 13 has elasticity, and can provide friction force. The substrate 20 can be made of glass. In the present embodiment, the substrate 20 is also ring-shaped.

Second, the substrate 20 is engaged in the retaining member 11. This step can be realized by disposing the substrate 20 in the retaining member 11 and engaging the substrate 20 with the rubber ring 13. Preferably, the rubber ring 13 is fittingly received in the recess 120, i.e., an outer diameter and an inner diameter of the rubber ring 13 are equal to a diameter of the recess 120 and a diameter of the inner space 113, respectively. In the present embodiment, a diameter of the substrate 20 is slightly larger than that of the inner space 113, and the rubber ring 13 is compressed (see FIG. 3), and thus the substrate 20 is steadily retained by the recess 120 and the rubber ring 13. In other embodiments, a diameter of the substrate 20 can be equal to that of the inner space 113, and the substrate 20 can be retained by the rubber ring 13, because the rubber ring 13 gives friction force to the substrate 20.

Third, viscous liquid polydimethyl siloxane (PDMS) containing material 116 is disposed on the substrate 20 in the inner space 113. The viscous liquid PDMS containing material 116 may only be disposed at a central region of the substrate 20. The viscous liquid PDMS containing material 116 may contain other additives, such as a hardener. The PDMS and the hardener can be mixed together in a proportion of 10:1. The retaining member 11 can prevent the viscous liquid PDMS containing material 116 from flowing out.

Figure 4:
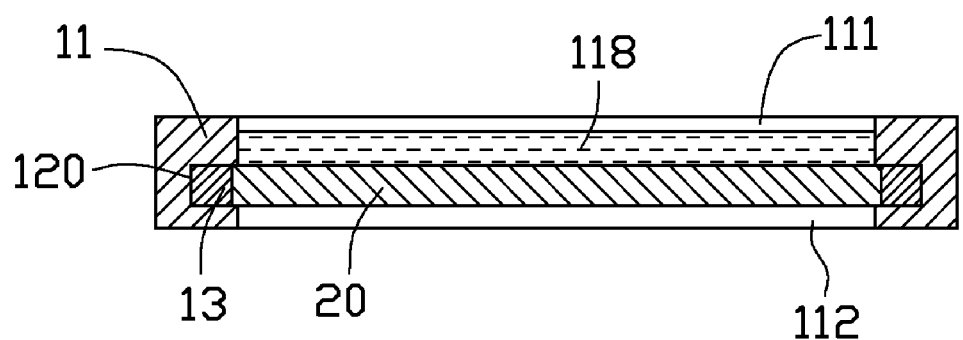
FIG. 4 shows the viscous liquid PDMA containing material of FIG. 3 forms a PDMA containing layer after rotation of the substrate and the retaining member.

Fourth, the retaining member 11 and the substrate 20 are rotated to cause the PDMS containing material 116 to spread out on the substrate 20 and form a polydimethyl siloxane (PDMS) containing layer 118 (see FIG. 4). The retaining member 11 and the substrate 20 can be rotated by a machine. Air bubbles left in the liquid PDMS or produced by the mixing process of the PDMS with other additives can be moved to the inner wall of the retaining member 11 and gradually eliminated due to the rotation of the retaining member 11 and the substrate 20. The PDMS containing layer 118 also has a flat top surface due to the rotation.

Figure 5:
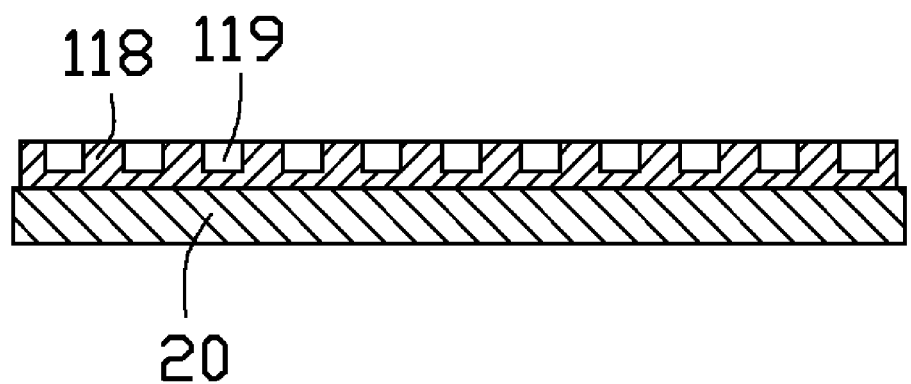
FIG. 5 shows a mold made by the method in accordance with an embodiment.

Fifth, the PDMS containing layer 118 is press-molded using a stamper (not shown) to form one or more molding portions 119 (see FIG. 5) on the PDMS containing layer 118.

Sixth, the PDMS containing layer 118 with the one or more molding portions 119 is solidified. This step can be realized by a heating method or a light curing method.

Seventh, the stamper is separated from the PDMS containing layer 118.

Eighth, the substrate 20 is separated from the retaining member 11 to obtain a mold (see FIG. 5) including the substrate 20 and the PDMS containing layer 118 with the one or more molding portions 119. In the present embodiment, as the diameter of the substrate 20 is slightly larger than that of the inner space 113, the substrate 20 has to be slantingly detached from the retaining member 11 through the second opening 112. The elasticity of the rubber ring 13 facilitates detaching of the substrate 20 from the retaining member 11. The substrate 20 can be configured for supporting the PDMS containing layer 118, and thus increase the rigidity of the entire mold.

In other embodiments, the PDMS containing layer 118 with one or more molding portions 119 can be peeled off from the substrate 20. The PDMS containing layer 118 with the one or more molding portions 119 can be used as a soft mold for molding micro-workpieces.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A method for making a mold, the method comprising:
    providing a substrate and a retaining member, the retaining member comprising an inner space, and a first opening and an opposite second opening both communicating with the inner space, wherein a recess is formed in an inner wall of the retaining member, and a rubber ring is received in the recess;
    engaging the substrate with the retaining member, so that the substrate is steadily retained by the rubber ring and the recess;
    disposing viscous liquid polydimethyl siloxane containing material on the substrate in the inner space via the first opening;
    rotating the retaining member and the substrate to cause the polydimethyl siloxane containing material to spread out on the substrate and form a polydimethyl siloxane containing layer;
    press-molding the polydimethyl siloxane containing layer using a stamper to form one or more molding portions on the polydimethyl siloxane containing layer;
    solidifying the polydimethyl siloxane containing layer with the one or more molding portions;
    separating the stamper from the polydimethyl siloxane containing layer; and
    separating the substrate from the retaining member by pulling the substrate through the second opening to obtain a mold comprising the substrate and the polydimethyl siloxane containing layer with the one or more molding portions.

2. The method as described in claim 1, wherein the retaining member is made of polytetrafluoroethylene.

3. The method as described in claim 1, wherein the retaining member is ring-shaped.

4. The method as described in claim 3, wherein the recess is ring-shaped.

5. The method as described in claim 1, wherein the substrate is made of glass.

6. The method as described in claim 1, further comprising separating the polydimethyl siloxane containing layer with the one or more molding portions from the substrate.

7. The method as described in claim 4, wherein an outer diameter and an inner diameter of the rubber ring are substantially equal to a diameter of the recess and a diameter of the inner space, respectively.

8. The method as described in claim 1, wherein a diameter of the substrate is slightly greater than a diameter of the inner space, and when the substrate is retained by the recess, the rubber ring is compressed.

* * * * *